United States Patent
Ojima

(10) Patent No.: US 7,167,202 B2
(45) Date of Patent: Jan. 23, 2007

(54) IMAGE PICK-UP APPARATUS AND DISTANCE MEASURING DEVICE

(75) Inventor: Noriaki Ojima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 952 days.

(21) Appl. No.: 10/125,483

(22) Filed: Apr. 19, 2002

(65) Prior Publication Data

US 2002/0154907 A1   Oct. 24, 2002

(30) Foreign Application Priority Data

Apr. 19, 2001   (JP)   ............................. 2001-121538

(51) Int. Cl.
*G03B 13/00* (2006.01)
*H04N 5/232* (2006.01)

(52) U.S. Cl. ........................ 348/348; 348/371; 348/135

(58) Field of Classification Search ................ 348/371, 348/395, 135, 348, 370; 356/3; 382/106; 396/121; 395/431, 159

See application file for complete search history.

(56) References Cited

U.S. PATENT DOCUMENTS

| | | | | |
|---|---|---|---|---|
| 5,589,905 A | * | 12/1996 | McIntyre | .................... 396/431 |
| 5,610,678 A | * | 3/1997 | Tsuboi et al. | ................ 396/373 |
| 5,682,562 A | * | 10/1997 | Mizukoshi et al. | ......... 396/159 |
| 6,175,693 B1 | * | 1/2001 | Iida | ............................. 396/121 |
| 6,330,355 B1 | * | 12/2001 | Chen et al. | .................. 382/151 |
| 6,538,751 B2 | * | 3/2003 | Ono | ........................... 356/614 |
| 6,700,619 B1 | * | 3/2004 | Hamamura | ................. 348/370 |
| 6,963,376 B2 | * | 11/2005 | Nakamura | ................... 348/345 |

FOREIGN PATENT DOCUMENTS

JP   4-134328   5/1992

* cited by examiner

*Primary Examiner*—Vivek Srivastava
*Assistant Examiner*—Gevell Selby
(74) *Attorney, Agent, or Firm*—Oblon, Spivak, McClelland, Maier & Neustadt, P.C.

(57) ABSTRACT

An image pick-up apparatus comprises a distance measuring unit that measures a distance to a subject, and a stroboscope that emits light of an intensity determined based on the measured distance. There are further provided a distance calculating section that calculates a distance to the subject based on the current feed quantity of a focus lens, when the distance measuring unit has failed in the measurement of the distance to the subject, and a light intensity determining section that determines the intensity of light to be emitted from the stroboscope based on the calculated distance.

26 Claims, 6 Drawing Sheets

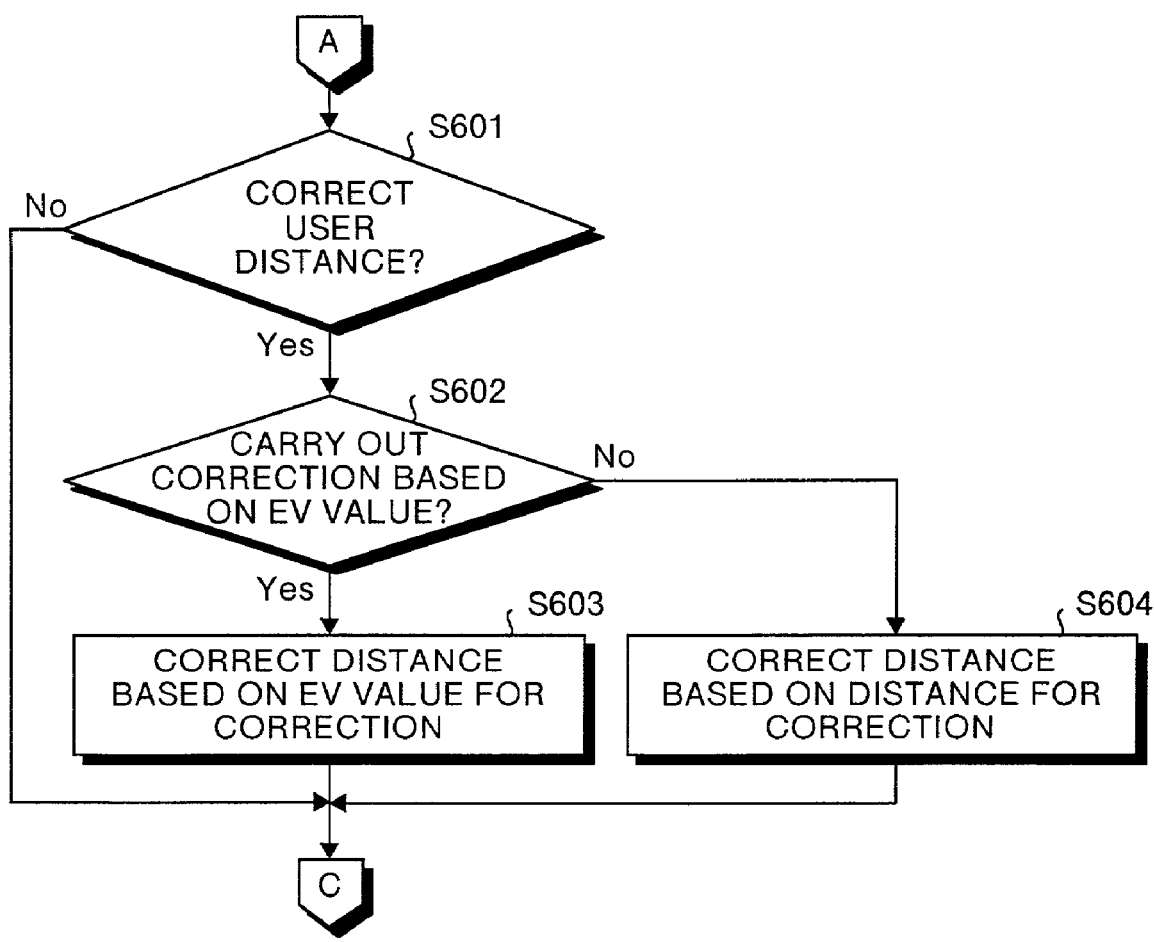

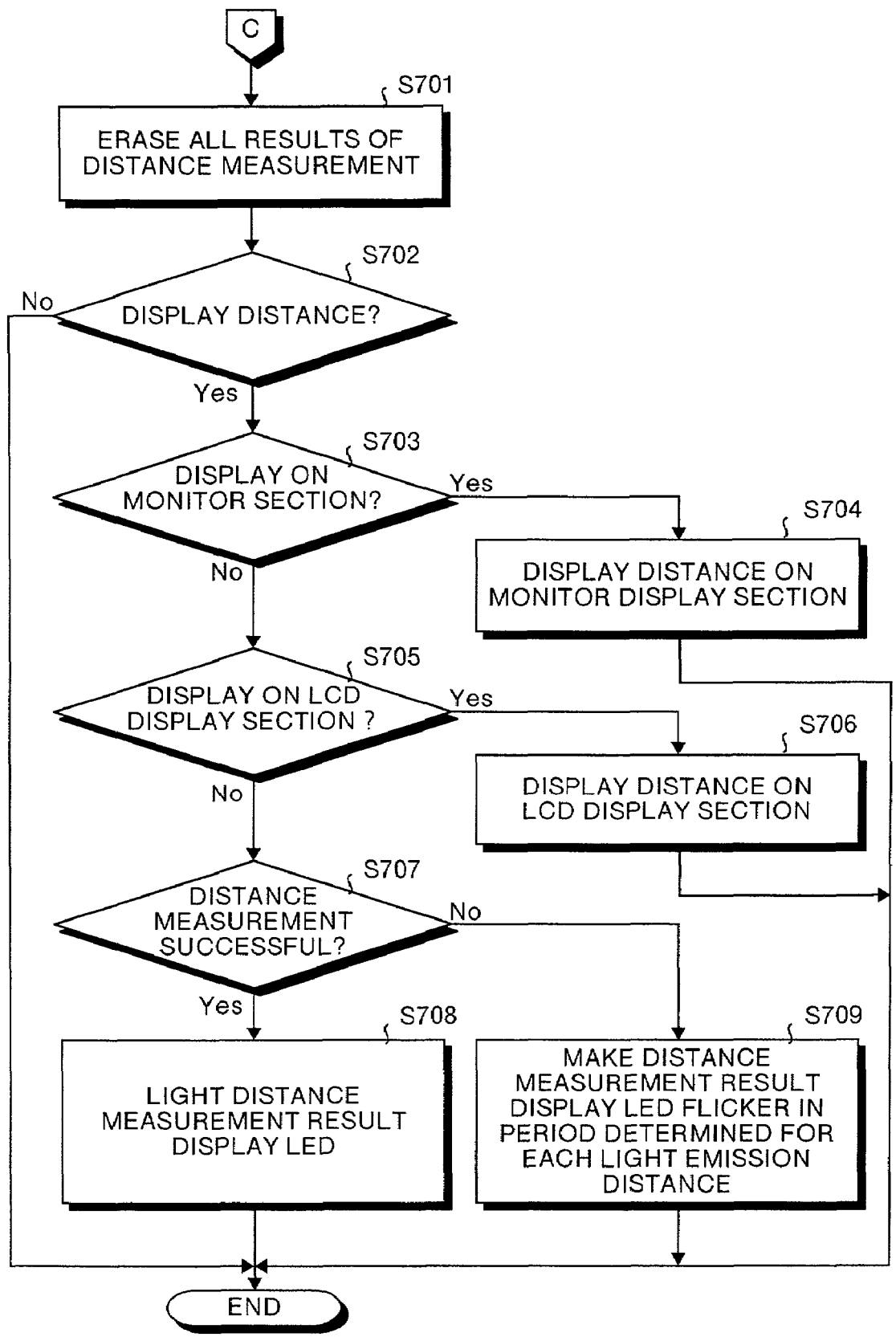

IMAGE PICK-UP APPARATUS AND DISTANCE MEASURING DEVICE

FIELD OF THE INVENTION

This invention relates to an image pick-up apparatus equipped with a range finder ("distance measuring device") and a an electronic flash gun ("stroboscope"), and illuminates a subject with a light of an intensity determined based on a distance measured by the distance measuring device.

BACKGROUND OF THE INVENTION

Image pick-up apparatus provided with a stroboscopic ("stroboscopic image pick-up apparatus") generally estimates a distance to a subject and illuminates the subject using the stroboscopic with a light of intensity determined based on the estimated distance. However, when there is a failure in distance estimation, then generally the subject is illuminated assuming that it is at a predetermined distance. The distance is generally estimated using a distance measuring device. However, the distance may be estimated based on a zoom position and a focus lens position.

Japanese Patent Application Laid-open (JP-A) No. 4-134328, for example, discloses a device for a camera that estimates a distance to a subject. This device makes it possible to accurately estimate the distance to the subject based on a zoom position and a focus lens position by absorbing a variation of lenses.

JP-A No. 4-134328 does not disclose about controlling light emitted by the stroboscope based on the estimated distance.

SUMMARY OF THE INVENTION

It is an object of the present invention to provide an image pick-up apparatus that can calculate intensity of light to be emitted from the stroboscope even if the distance measuring device has failed in measurement of the distance to the subject.

The image pick-up apparatus according to the present invention comprises a distance measuring unit that measures a distance to a subject and outputs distance measurement information when measurement of the distance is successful, at least one distance deciding unit that decides the distance to the subject based on certain method when the distance measurement information is not output by the distance measuring unit, a light intensity determining unit that determines an intensity of light corresponding to the distance to the subject, and a stroboscope that emits a light of the intensity determined by the light intensity determining unit.

Other objects and features of this invention will become apparent from the following description with reference to the accompanying drawings.

BRIEF DESCRIPTION OF THE DRAWINGS

FIG. 6 is a flowchart which shows still another operation of the image pick-up apparatus according to the embodiment of the present invention, and FIG. 7 is a flowchart which shows still another operation of the image pick-up apparatus according to the embodiment of the present invention.

DETAILED DESCRIPTIONS

Embodiment of the image pick-up apparatus according to the present invention will be explained in detail below with reference to the accompanying drawings.

Figure 1:
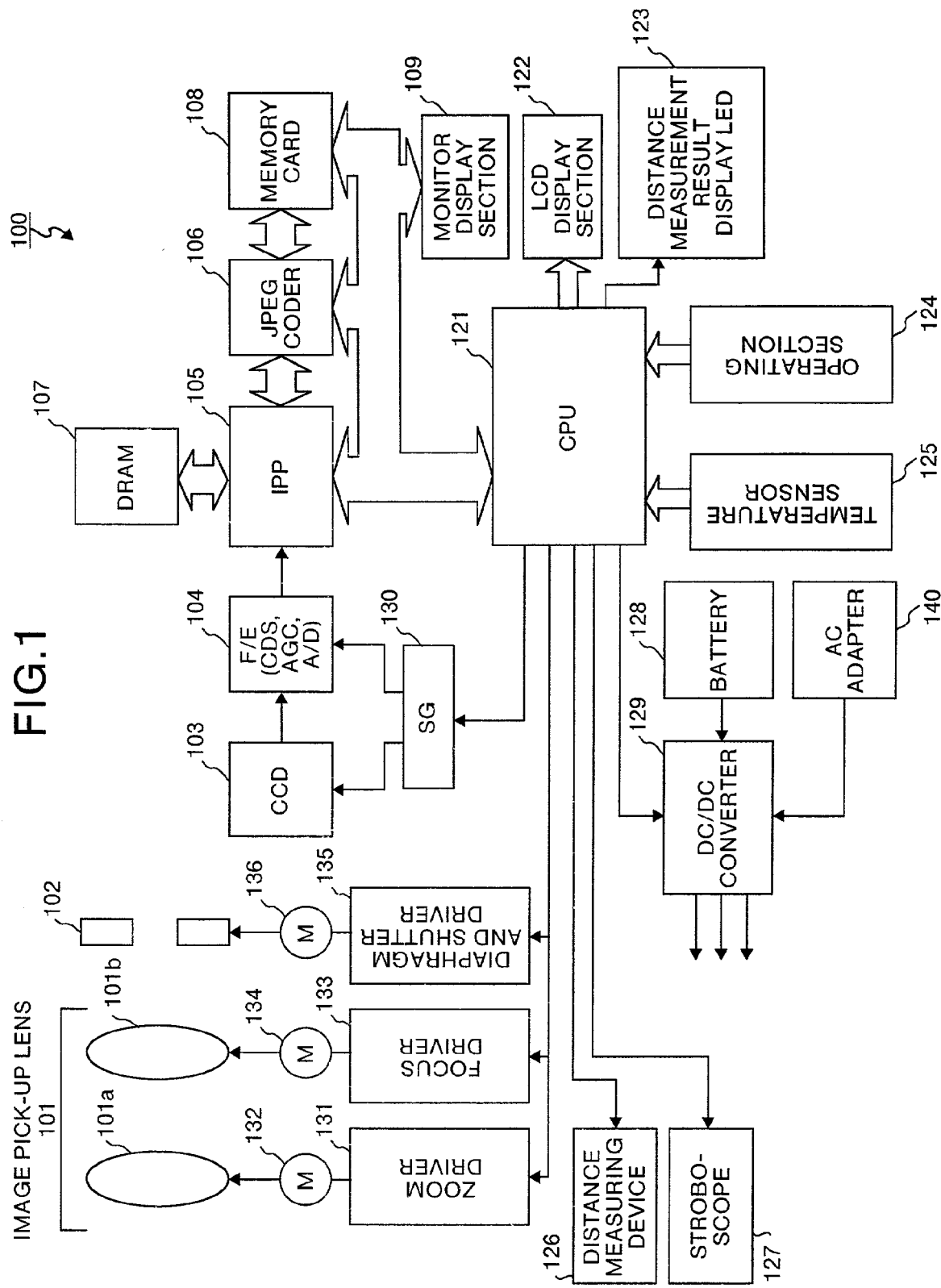
FIG. 1 is a block diagram which shows a hardware structure of an image pick-up apparatus according to an embodiment of the present invention.

To begin with, hardware structure of the image pick-up apparatus will be explained. FIG. 1 is a block diagram which shows a hardware structure of a digital camera as an image pick-up apparatus according to the present invention.

In FIG. 1, a reference number 100 denotes a digital camera. The digital camera 100 is constructed of an image pick-up lens (system) 101, a mechanical system 102 including a diaphragm and a filter, a CCD (charge-coupled device) 103, an F/E (a CDS circuit, an AGC amplifier (a variable gain amplifier), and an A/D converter) 104, an IPP 105, a coder (JPEG coder) 106, a DRAM 107, a memory card 108, a monitor display section 109, a CPU 121, an LCD display section 122, a distance measurement result display LED 123, an operating section 124, a temperature sensor 125, a distance measuring device 126, a stroboscope 127, a battery 128, a DC/DC converter 129, an SG (a control signal generator) 130, a zoom driver 131, a zoom motor 132, a focus driver 133, a focus motor 134, a diaphragm and shutter driver 135, a diaphragm and shutter motor 136, and an AC adapter 140.

A lens unit consists of the image pick-up lens (system) 101, and the mechanical system 102 including a diaphragm and a filter. A mechanical shutter of the mechanical system 102 carries out a simultaneous exposure of two fields. The image pick-up lens (system) 101 consists of a varifocal lens, for example, and is structured by a zoom lens system 101a and a focal lens system 101b.

The zoom driver 131 drives the pulse motor 132 as a zoom motor according to a control signal supplied from the CPU 121, and moves the zoom lens system 101a to a light axis direction. The focus driver 133 drives the pulse motor 134 as a focus motor according to a control signal supplied from the CPU 121, and moves the focus lens system 101b to a light axis direction.

The diaphragm and shutter driver 135 drives the pulse motor 136 as a diaphragm and shutter motor that operates the mechanical system 102 according to a control signal supplied from the CPU 121, and sets a diaphragm value, for example.

The CCD (charge-coupled device) 103 converts an image input via the lens unit into an electric signal (analog image data). The CDS (correlation double sampling) circuit included in the F/E 104 is a circuit that reduces noise of a CCD type image pick-up device.

Similarly, the AGC amplifier included in the F/E 104 corrects a level of a signal obtained from a correlation double sampling by the CDS circuit. A gain of the AGC amplifier is set when the CPU 121 sets a set data (a control voltage) to the AGC amplifier via a D/A converter incorporated in the AGC amplifier.

Similarly, the A/D converter included in the F/E 104 converts an analog image data input from the CCD 103 via the AGC amplifier into a digital image data. In other words, an output signal from the CCD 103 is converted into a digital signal in an optimum sampling frequency (for example, an integer times a sub-carrier frequency of an NTSC signal) by the A/D converter, via the CDS circuit and the AGC amplifier.

The IPP (image pre-processor) 105 as a digital signal processing section and the coder (JPEG coder) 106 carry out various kinds of processing and a data processing of a correction and an image compression/expansion of the digital image data input from the A/D converter, by dividing the data into a color difference (Cb, Cr) and luminance (Y).

The coder 106 carries out an orthogonal conversion and an inverses orthogonal conversion as one process of JPEG-based image compression/expansion, and a Huffman coding and decoding as one process of JPEG-based image compression/expansion.

The IPP 105 detects a luminance data (Y) of a G image data, and outputs an AE evaluation value to the CPU 121 corresponding to the detected luminance data (Y). This AE evaluation value shows a luminance (brightness) of a subject. Further, the IPP 105 outputs an AWB (auto white balance) evaluation value to the CPU 121 corresponding to each luminance data (Y) of image data of R, G and B within a set range of color temperature. This AWB evaluation value shows color components of the subject.

The memory card 108 records or reads a compressed image once stored in an MCC (memory card controller) not shown via a card interface not shown.

The monitor display section 109 displays an image on the monitor or displays a picked-up image by reproducing the image. The monitor display section 109 also displays an image data, an operation menu, and a distance measured result. A compact liquid-crystal display like a TFT can be used for the monitor display section 109.

The LCD (liquid-crystal display) display section 122 consists of a reflection-type LCD disposed at a viewer side, and displays an image data and an operation menu.

The distance measurement result display LED 123 emits light when a distance has been measured successfully, and flickers when a distance has not been measured successfully, based on a result of a distance measured by the distance measuring device 126. The distance measurement result display LED 123 is a pn-junction semiconductor device. When current flows in a forward direction (from a p-type semiconductor side to an n-type semiconductor side) based on an application of a voltage to the pn-junction section, electric energy is converted into optical energy on the pn-junction surface, and light is emitted.

The temperature sensor 125 is a sensor that converts the current temperature into a voltage, and outputs this voltage. The temperature sensor 125 corrects the temperature of the result of a distance measured by the distance measuring device 126.

The distance measuring device 126 is a phase-difference sensor that measures a distance to a subject. An infrared sensor, for example, maybe used for the distance measuring device 126.

The stroboscope (circuit) 127 emits light based on a control of the CPU 121. In other words, the stroboscope (circuit) 127 emits light of an intensity determined based on a distance measured by the distance measuring device 126.

The battery 128 is used for a camera power source, and consists of a nickel hydrogen battery, a lithium ion battery, an NiCd battery, or an alkali battery, for example. Power is supplied to the inside of the digital camera 100 via the DC/DC converter 129. The DC/DC converter 129 incorporates a switch circuit that turns ON/OFF various kinds of power sources of which power is supplied to the inside of the digital camera based on a control of the CPU 121.

The CPU 121 controls the whole apparatus of the digital camera 100 by using a RAM not shown as a work area, according to a control program stored in a ROM not shown, based on an instruction from the operation section 124 or an external operation instruction from a remote controller or the like not shown. Specifically, the CPU 121 controls various kinds of operation like an image pick-up operation, an automatic exposure (AE) operation, an automatic white balance (AWB) adjustment operation, an AF operation, and a display.

Further, the CPU 121 has a recording mode for recording an image data obtained by photographing a subject onto the memory card 108, a reproduction mode for reproducing an image data recorded on the memory card 108 and displaying the data on the LCD display section 122, and a monitoring mode for directly displaying a photographed monitor image on the LCD display section 122. Further, the CPU 121 has a fixed mode, an external light adaptive mode, an auxiliary light using mode, and a maximum contrast mode as display modes for displaying an image on the LCD display section 122 in the reproduction mode or the monitoring mode. These modes are selected using the operation section 124.

Figure 2:
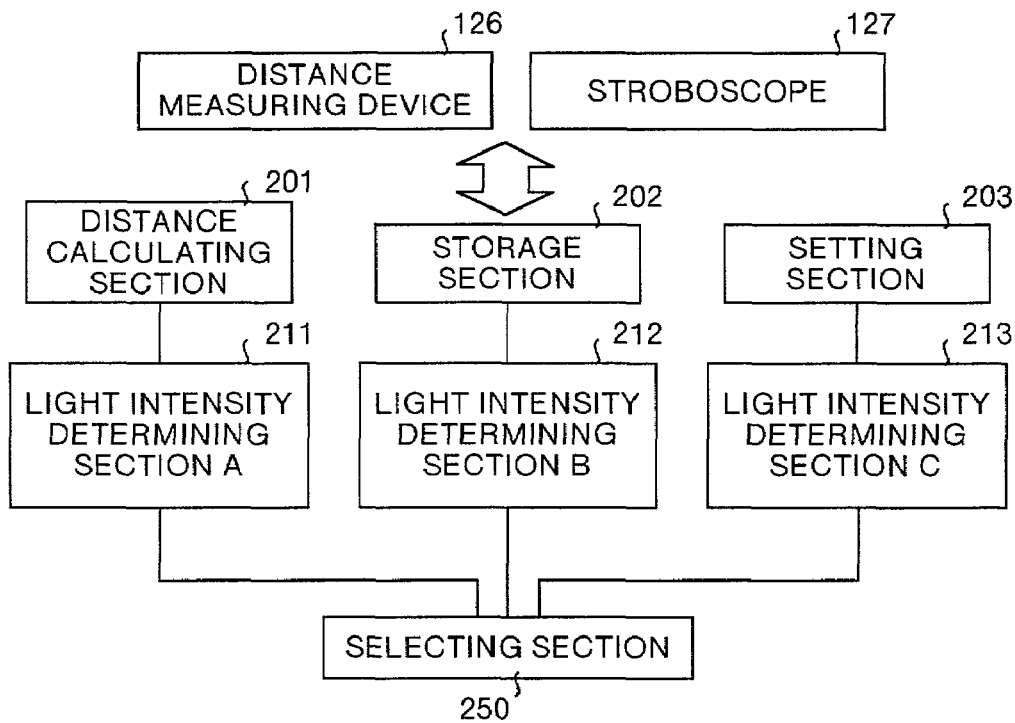
FIG. 2 is a block diagram which shows a functional structure of the image pick-up apparatus according to the embodiment of the present invention.

A functional structure of the image pick-up apparatus according to the embodiment of the present invention will be explained next. FIG. 2 is a block diagram which shows a functional structure of the image pick-up apparatus according to the embodiment of the present invention. In FIG. 2, the image pick-up apparatus according to the present embodiment comprises a distance calculating section 201, a storage section 202, a setting section 203, a light intensity determining section A 211, a light intensity determining section B 212, a light intensity determining section C 213, and a selecting section 250.

The distance calculating section 201 calculates a distance to the subject based on a feed quantity from the current focal lens system 101*b*, when the distance measuring device 126 has failed to measure a distance to the subject. The distance calculating section 201 realizes its function based on the execution of the CPU 121 by using a RAM not shown as a work area, according to a control program stored in a ROM not shown.

The light intensity determining section A 211 determines a light intensity of light to be emitted based on the distance calculated by the distance calculating section 201. The light intensity determining section A 211 realizes its function based on the execution of the CPU 121 by using a RAM not shown as a work area, according to a control program stored in a ROM not shown, in a similar manner to that of the distance calculating section 201.

In other words, when the distance measuring device 126 has failed to measure the distance to the subject, the distance calculating section 201 calculates a distance using the focus made by the lens, and the light intensity determining section A 211 determines the light intensity based on the calculated distance. The distance measuring device 126 may not be able to calculate the distance to the subject such as a repetition pattern. For example, the distance measuring device 126 that utilizes a trigonometrical measurement is not good at measuring a distance to a subject when the subject includes an array of small letters like a report.

In this instance, it is possible to pick up an image in good focus when there is used an automatic focusing system that finds a focal point based on a contrast of a subject like a mountain-climbing system CCD-AF or a manual focus. However, if the stroboscope 127 emits light at this time, an image is picked up with an insufficient strobe light quantity.

In this instance, it is possible to pick up an image with a proper strobe light quantity, if the stroboscope 127 emits light based on a distance to the subject calculated from the current focus feed quantity. Therefore, when the distance measuring device 126 has failed to measure the distance, the distance is calculated based on the focus position.

The storage section 202 stores a distance for light emission for each image pick-up mode in advance. For example, the storage section 202 can realize a mark by using a storage medium like a DRAM 107.

When the distance measuring device 126 has failed to measure the distance to the subject, the light intensity determining section B 212 determines intensity of the light based on the distance determined for the current image pick-up mode that is stored in the storage section 202. The light intensity determining section B 212 realizes its function based on the execution of the CPU 121 by using a RAM not shown as a work area, according to a control program stored in a ROM not shown, in a similar manner to that of the light intensity determining section A 211.

In other words, distance determined in advance are set for each image pick-up mode to prepare for an instance where the distance measuring device 126 has failed to measure the distance to the subject. For example, in the person image pick-up mode, in many instances, a photographing is carried out based on a distance of 1.5 m and at a zoom wide-angle side. In the letter image pick-up mode, in many instances, a photographing is carried out based on a distance of 85 cm and at a zoom telephoto side.

Therefore, when the distance is set for each image pick-up mode in advance, there is a high possibility that a proper light intensity is obtained. Further, when this distance is made open to users in a handling manual or the like, users can carry out a photographing in a proper light intensity by setting a photographing distance to this distance. As explained above, when the distance measuring device 126 has failed to measure the distance, the distance set in advance for each image pick-up mode can be used, and the stroboscope can emit light in the light intensity corresponding to a distance set in advance for the current image pick-up mode.

The setting section 203 can set a distance. More specifically, it is possible to set a distance with the operating section 124. It is also possible to input information on a distance by using the memory card 108.

When the distance measuring device 126 has failed to measure the distance, the light intensity determining section C 213 determines the intensity of light based on a distance set in advance by the setting section 203. The light intensity determining section BC 213 realizes its function based on the execution of the CPU 121 by using a RAM not shown as a work area, according to a control program stored in a ROM not shown, in a similar manner to that of the light intensity determining section A 211 and the light intensity determining section B 212.

In other words, a user can set the light intensity to prepare for an instance where the distance measuring device 126 has failed to measure the distance. With this arrangement, the user can set a distance to match the state of a photographing distance, a reflectance of a subject, and a purpose for photographing. Consequently, it becomes possible to obtain a proper light intensity. Therefore, the user can set the intensity of the light when the distance measuring device 126 has failed to measure the distance.

When the distance measuring device 126 has failed to measure a distance, the selecting section 250 selects one of the light intensity determining section A 211, the light intensity determining section B 212, and the light intensity determining section C 213. More specifically, it is possible to select one of these light intensity determining sections with the operating section 124.

Based on the above arrangement, it is possible to set a light intensity according to the above-described photographing state and a user photographing level. With the above arrangement, when the distance measuring device 126 has failed to measure the distance, a user can select any one of a setting that the distance is calculated from the feed quantity of the current focal pulse, a setting that a distance is set in advance for each photographing mode and a distance that matches the current light emission mode is selected, and a setting that a user selects a distance.

Figure 3:
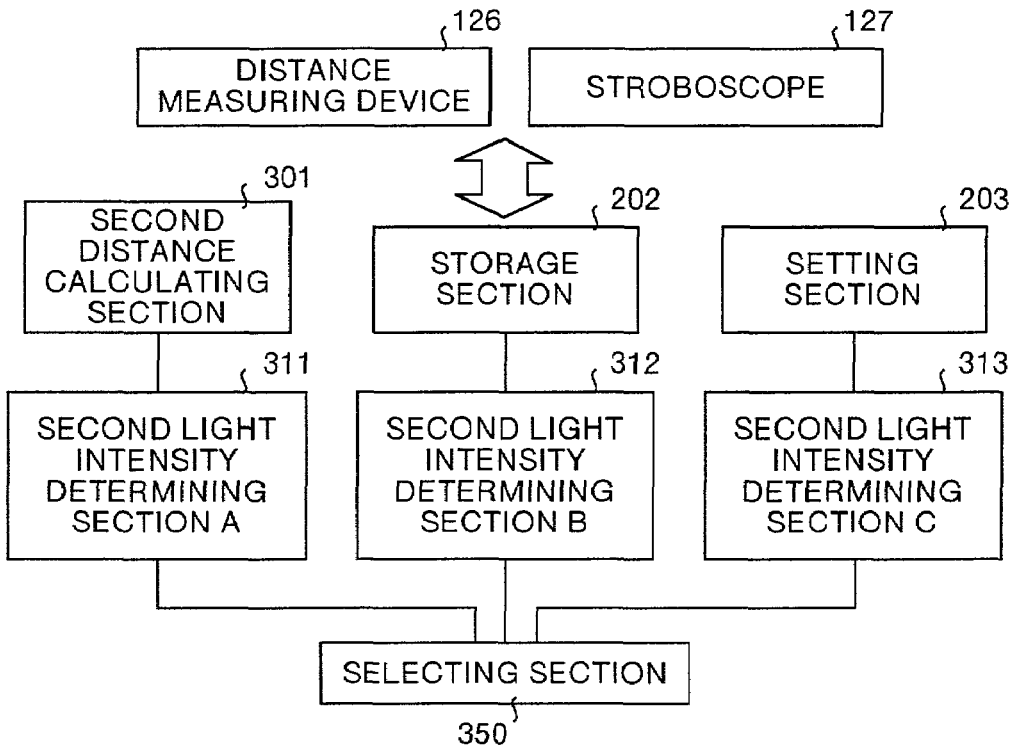
FIG. 3 is a block diagram which shows another functional structure of the image pick-up apparatus according to the embodiment of the present invention.

FIG. 3 is a block diagram which shows another functional structure of the image pick-up apparatus according to the embodiment of the present invention. In FIG. 3, the image pick-up apparatus according to the present embodiment is constructed of a second distance calculating section 301, a storage section 202, a setting section 203, a second light intensity determining section A311, a second light intensity determining section B312, a second light intensity determining section C313, and a selecting section 350. The storage section 202 and the setting section 203 have similar structures to those shown in FIG. 2, and have the same reference numbers. Therefore, their explanation will be omitted.

The second distance calculating section 301 calculates a distance to a subject based on a limit feed quantity that makes it possible to calculate a distance to the subject, when the distance measuring device 126 has failed to measure the distance and also when it has failed to calculate a distance to the subject from the current focus feed quantity. The second distance calculating section 301 realizes its function based on the execution of the CPU 121 by using a RAM not shown as a work area, according to a control program stored in a ROM not shown.

The second light intensity determining section A311 determines the intensity of the light based on a distance calculated by the second distance calculating section 301. The second light intensity determining section A311 realizes its function based on the execution of the CPU 121 by using a RAM not shown as a work area, according to a control program stored in a ROM not shown, in a similar manner to that of the second distance calculating section 301.

In other words, when the distance measuring device 126 has failed to measure the distance and also when it has failed to calculate the distance from the current focus feed quantity, the distance is calculated from a focus limit feed quantity that can be calculated. In general, a focus feed quantity has a fine distance precision when a subject is at a short distance, and has a rough distance precision when the subject moves to an infinite distance direction.

Further, a zoom lens has a rough distance precision at a wide area side, and has a fine distance precision at a telephoto side. Therefore, when a zoom position is at a wide area side, that is, at an infinite side of a small focus feed quantity, the precision is rough. Therefore, at this side, it may not be possible to calculate the distance.

In this instance, it is possible to prevent the occurrence of a white skipping of a picked-up image, by emitting light after calculating the distance from a limit focus feed quantity that can have high precision. According to this method, there is a high possibility that a photographed image becomes dark. It is difficult to restore a white-skipped image, as information has been lost. However, there is a possibility that it is possible to restore an image from a dark image, based on a digital processing.

As explained above, when the distance measuring device 126 has failed to measure the distance and also when it has failed to calculate the distance from the current focus feed quantity, the distance is calculated from a focus limit feed quantity that can be calculated.

The second light intensity determining section B312 determines the intensity of the light based on the distance determined from the current photographing mode that has been stored in the storage section 202, when the distance measuring device 126 has failed to measure the distance and also when it has failed to calculate the distance from the current focus feed quantity. The second light intensity determining section B312 realizes its function based on the execution of the CPU 121 by using a RAM not shown as a work area, according to a control program stored in a ROM not shown, in a similar manner to that of the second light intensity determining section A311.

In other words, when the distance measuring device 126 has failed to measure the distance and also when it has failed to calculate the distance from the current focus feed quantity, the distance is prepared in advance for each photographing mode. As explained above, a photographing distance varies depending on the photographing mode, and there is a distance at which a subject can be photographed in good focus.

Therefore, when the distance is set for each image pick-up mode in advance, there is a high possibility that a proper light intensity is obtained. Further, when this distance is made open to users in a handling manual or the like, users can carry out a photographing in a proper light intensity by setting a photographing distance to this distance. As explained above, when the distance measuring device 126 has failed to measure the distance and also when it has failed to calculate the distance from the current focus feed quantity, the distance set in advance for each image pick-up mode can be used, and the stroboscope can emit light of intensity corresponding to the distance set in advance for the current image pick-up mode.

The second light intensity determining section C313 determines the intensity of the light based on a distance set by the setting section 203, when the distance measuring device 126 has failed to measure the distance and also when it has failed to calculate the distance from the current focus feed quantity. The second light intensity determining section C313 realizes its function based on the execution of the CPU 121 by using a RAM not shown as a work area, according to a control program stored in a ROM not shown, in a similar manner to that of the second light intensity determining section A311 and the second light intensity determining section B312.

In other words, a user can set a distance to prepare for an instance where the distance measuring device 126 has failed to measure the distance and also when it has failed to calculate the distance from the current focus feed quantity. With this arrangement, the user can set a distance to match the state of a photographing distance, a reflectance of a subject, and a purpose for photographing. Consequently, it becomes possible to emit light of proper intensity. Therefore, the user can set the light intensity when the distance measuring device 126 has failed to measure the distance and also when it has failed to calculate the distance from the current focus feed quantity.

When the distance measuring device 126 has failed to measure the distance and also when it has failed to calculate the distance from the current focus feed quantity, the selecting section 350 selects one of the second light intensity determining section A 211, the second light intensity determining section B 212, and the second light intensity determining section C 213. More specifically, it is possible to select one of these light intensity determining sections with the operating section 124.

In other words, when the distance measuring device 126 has failed to measure the distance and also when it has failed to calculate the distance from the current focus feed quantity, a user can select any one of a setting that the distance to the subject is calculated from a limit feed quantity that makes it possible to calculate the distance, a setting that the distance is set in advance for each photographing mode and light of intensity is emitted according to a distance determined for the current light emission mode, and a setting that light of intensity set by the user is emitted.

Based on the above arrangement, it is possible to set the light intensity according to the above-described photographing state and a user photographing level. Therefore, a user can select any one of a setting that a distance to the subject is calculated from a limit feed quantity that makes it possible to calculate a distance to the subject, a setting that a distance is set in advance for each photographing mode and light is emitted according to a distance determined for the current light emission mode, and a setting that light is emitted based on a setting by the user.

The image pick-up apparatus of the present embodiment has a photographing mode for picking up an image by bringing a focus into a subject based on a distance set in advance by a user. When the distance measuring device 126 has failed to measure the distance, any of the above light intensity determining sections may determine the light intensity based on the focused distance.

With the above structure, it is possible to emit light according to a distance focused in advance by the user, in the photographing mode for picking up an image by bringing a focus into a subject based on a distance set in advance by a user when the distance measuring device 126 has failed to measure a distance. In this photographing mode, as a user has selected a distance, the proper light intensity is obtained when light is emitted to match this distance. Therefore, in the photographing mode for picking up an image by bringing a focus into a subject based on a distance set in advance by a user when the distance measuring device 126 has failed to measure the distance, light is emitted according to a distance focused in advance by the user.

Further, the image pick-up apparatus of the present embodiment has a photographing mode for picking up an image by bringing a focus into a subject based on a distance set in advance by a user like the above structure, and the setting section 203 sets a distance. When the distance measuring device 126 has failed to measure the distance, any one of the light intensity determining sections may determine the light intensity based on the distance set by the setting section 203 different from the focused distance.

With the above structure, it is possible to set the distance to be emitted by the light separate from the distance focused by a user, in the photographing mode for picking up an image by bringing a focus into a subject based on a distance set in advance by the user when the distance measuring device 126 has failed to measure the distance. Consequently, it is possible to emit light of the intensity determining section set by the user.

A subject having high reflectance may be photographed with light reflected on the picked-up image, when light is emitted based on a focused distance in a state that a light intensity of light is determined based on a focused distance when the distance measuring device 126 has failed to measure the distance. On the other hand, depending on a purpose for photographing, it is desired to emit light in a strong strobe light.

It is possible to photograph a subject to meet the purpose for photographing, when light is emitted based on a distance different from the focused distance. Therefore, it is possible to set the distance separate from a distance focused by a user, in the photographing mode for picking up an image by bringing a focus into a subject based on a distance set in advance by the user when the distance measuring device 126 has failed to measure the distance. Consequently, it is possible to emit light according to setting by the user.

Further, the image pick-up apparatus of the present embodiment has the distance measuring device 126 that measures distance to the subject, and the stroboscope 127 that emits light based on the measured distance. In the photographing mode for picking up an image by bringing a focus into a subject based on a distance set in advance by a user when the distance measuring device 126 has failed to measure the distance, the user can select any one of an instance where light is emitted according to a distance focused by the user, and an instance where it is possible to set distance separate from a distance focused by a user and light is emitted according to the distance set by the user. With this arrangement, it is possible to set a light intensity according to the above-described photographing state and a user photographing level.

The image pick-up apparatus of the present embodiment may further comprise a light intensity correcting section that enables a user to correct a strong or weak light emission level of the light intensity determined by any one of the light intensity determining sections. The light intensity correcting section can set (input) a correction value with the operating section 124 or by using the memory card 108.

With the above structure, when the distance measuring device 126 has failed to measure a distance or when the distance measuring device 126 has failed to measure a distance and a distance to a subject has been calculated from the current feed quantity of the focus lens, a user can set strong or weak level of the intensity of the light determined based on this distance. As explained above, depending on the reflectance of the subject and the purpose for photographing, the light intensity that matches a distance to the subject does not necessarily coincide with the user's intended light intensity. Therefore, it becomes possible to photograph a subject to meet the purpose for photographing, when the user sets strong or weak of the strobe light even when the distance measuring device 126 has measured a distance successfully.

A unit on which the light intensity correcting section enables a user to correct a strong or weak level can be an EV (exposure value). By setting a correction in the EV unit instead of a simple strong or weak level, it becomes possible to correct in the same sense as an exposure correction.

Further, a unit on which the light intensity correcting section enables a user to set a strong or weak level can be a distance. This is because it is easier in some instances to understand the setting based on this distance than the EV unit.

The image pick-up apparatus of the present embodiment may further comprise a display section that displays a distance based on a distance measured by the distance measuring device 126. In other words, when the distance measuring device 126 has measured a distance successfully, the distance to which light is emitted is displayed. When the distance is displayed, it is possible to prevent the occurrence of a failure in a strobe photographing due to an erroneous measurement of a distance by the distance measuring device 126.

The image pick-up apparatus of the present embodiment may further comprise a display control section that controls the display section to display at least one of contents regarding the inability of measuring a distance and contents regarding a distance at a light emission time or a method of determining a distance at a light emission time, when the distance measuring device 126 has failed to measure a distance. The display control section realizes its function based on the execution of the CPU 121 by using a RAM not shown as a work area, according to a control program stored in a ROM not shown.

Based on the above structure, it is possible to display a part or the whole of a fact that it is not possible to measure a distance, a distance at a light emission time, and a method of determining this distance (a calculation from a focus feed quantity, a predetermined distance, and a user setting), when the distance measuring device 126 has failed to measure a distance. Based on the display of a fact that it is not possible to measure a distance, it is possible to urge the user to pay attention to this fact. Based on the display of a distance at a light emission time and a method of determining this distance, the user can judge whether a strobe photographing will be successful or not.

The display section may be constructed of the monitor display section 109 shown in FIG. 1. When the monitor display section 109 displays the contents, the user can confirm the distance to which the light is emitted while looking at a subject, which improves the easiness of handling the apparatus.

The display section may be constructed of the LCD (liquid-crystal display) display section 122 shown in FIG. 1. When the LCD display section 122 displays the contents, this can cope with a situation where the monitor display section 109 is not used to save energy.

The display control section can change a display color which displays a distance at a light emission time based on a method of determining a distance at a light emission time, when displaying a distance at a light emission time. In other words, it is possible to change a color of a display of a distance at a light emission time based on a method of determining the distance to which the light is emitted.

Based on this arrangement, it is possible to solve a difficulty in displaying a subject when various kinds of information are displayed on the monitor display section 109. By changing colors of a focal distance to user setting distance between success and failure based on a distance measurement, it is possible to avoid a complex display on the monitor screen.

Further, the display control section can change a light flicker period of displaying in flicker a distance at a light emission time based on a method of determining a distance at a light emission time, when the distance at a light emission time is displayed in flicker. In other words, it is possible to display in flicker a distance at a light emission time and change the flicker period according to a method of determining the distance to which the light is emitted.

The above method also avoids a complex display on the monitor display section 109. It is difficult to read clearly a differentiated color display when colors are displayed outdoors or depending on a usage state. In this instance, when colors are displayed by changing a flicker period, it is possible to avoid a difficulty in reading the color display.

The image pick-up apparatus of the present embodiment may further comprise an LED control section that controls the distance measurement result display LED (light-emitting diode) 123 to emit light when the distance measuring device 126 has measured a distance successfully, and flicker according to a flicker period based on the method of determining a distance at a light emission time when the distance measuring device 126 has not been able to measure a distance.

In other words, an LED that displays a result of measuring a distance to a subject is prepared. When a distance has been measured successfully, the LED emits light. When it has not been able to measure a distance, the LED flickers light, and the flicker period can be changed according to the method of determining the distance to which the light is emitted. The LED control section realizes its function based on the execution of the CPU 121 by using a RAM not shown as a work area, according to a control program stored in a ROM not shown.

Therefore, when the distance measuring device is compact or when the distance measuring device does not have the LCD display section 122 for cost reduction and does not use the monitor display section 109, it is possible to enable a user to understand a result of measuring the distance to which the light is emitted and a method of determining a distance.

Figure 4:
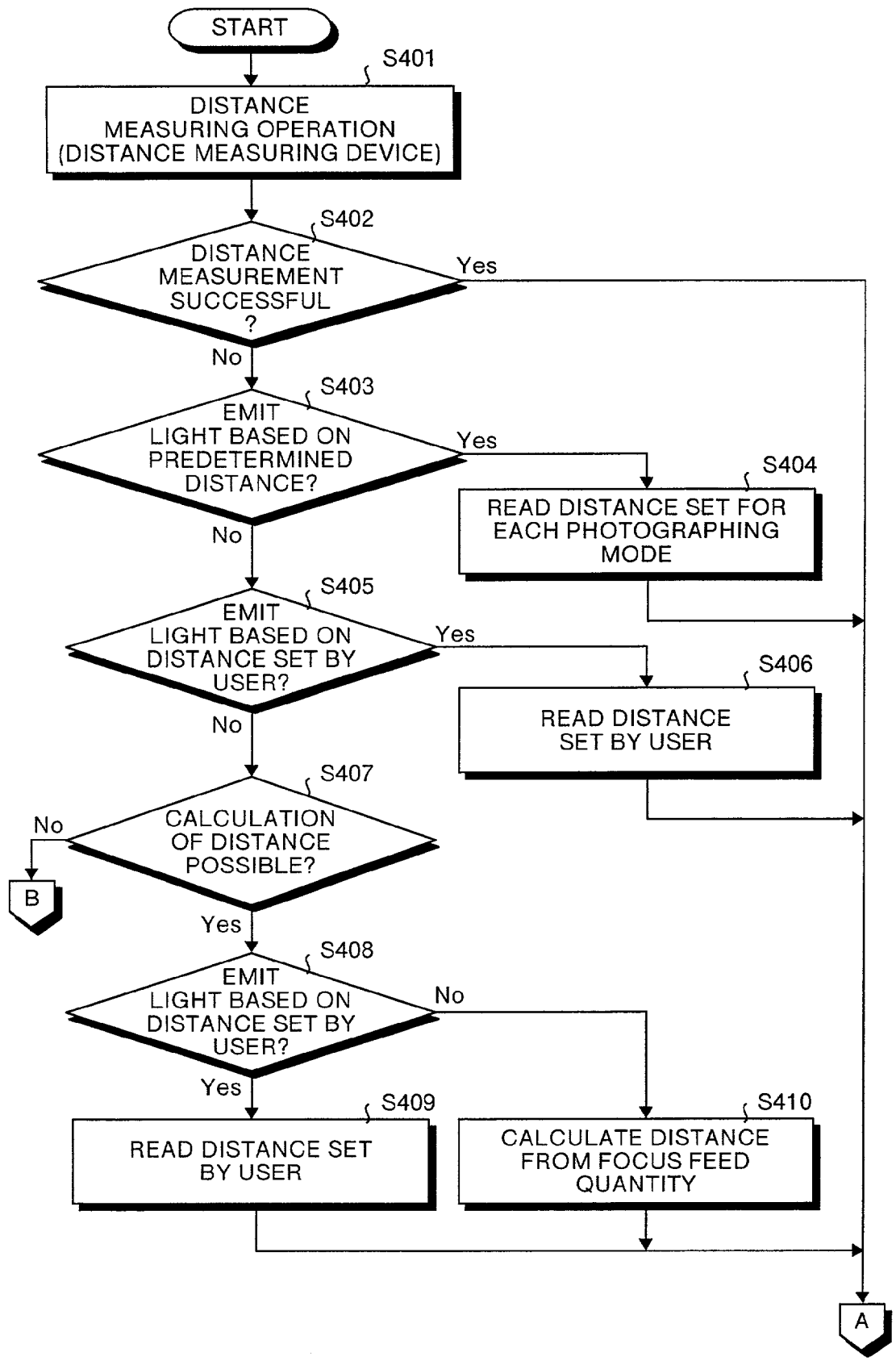
FIG. 4 is a flowchart which shows an operation of the image pick-up apparatus according to the embodiment of the present invention.

FIG. 4 to FIG. 7 are flowcharts which show the operation of the image pick-up apparatus according to the embodiment of the present invention. In FIG. 4, a strobe distance measuring operation is carried out. That is, the distance measuring device 126 measures a distance to a subject (step S401). Next, a distance measured result branches. It is decided whether a distance has been measured successfully or not (step S402).

When a distance has been measured successfully at step S402 (Yes at step S402), the process proceeds to a distance correction processing (step S601 and after) shown in FIG. 6 to be described later. On the other hand, when a distance has not been measured successfully at step S402 (No at step S402), it is decided whether light is to be emitted in a distance determined in advance for each photographing mode or not (step S403).

When it is decided that light is to be emitted in a distance determined in advance for each photographing mode (Yes at step S403), a distance determined for the current photographing mode is read (step S404). Then, the process proceeds to the distance correction processing (see FIG. 6).

On the other hand, when it is decided at step S403 that light is not to be emitted in a distance determined in advance for each photographing mode (No at step S403), it is decided whether light is to be emitted based on a distance set by the user or not (step S405). When it is decided that light is to be emitted based on a distance set by the user (Yes at step S405), the distance set by the user is read (step S406). Then, the process proceeds to the distance correction processing (see FIG. 6).

On the other hand, when it is decided at step S405 that light is not to be emitted based on a distance set by the user (No at step S405), it is decided whether it is possible to calculate the distance to which the light is emitted from the current focus feed quantity or not (step S407). When it is decided that it is not possible to calculate the distance to which the light is emitted from the current focus feed quantity (No at step S407), the process proceeds to step S501 shown in FIG. 5 to be described later.

On the other hand, when it is decided at step S407 that it is possible to calculate the distance to which the light is emitted from the current focus feed quantity (Yes at step S407), it is decided whether light is to be emitted in the distance set by the user or not (step S408). When it is decided that light is to be emitted in the distance set by the user (Yes at step S408), the distance set by the user is read (step S409). Then, the process proceeds to the distance correction processing (see FIG. 6).

On the other hand, when it is decided at step S408 that light is not to be emitted to the distance set by the user (No at step S408), the distance to which the light is emitted is calculated from the current focus feed quantity (step S410). Then, the process proceeds to the distance correction processing (see FIG. 6).

Figure 5:
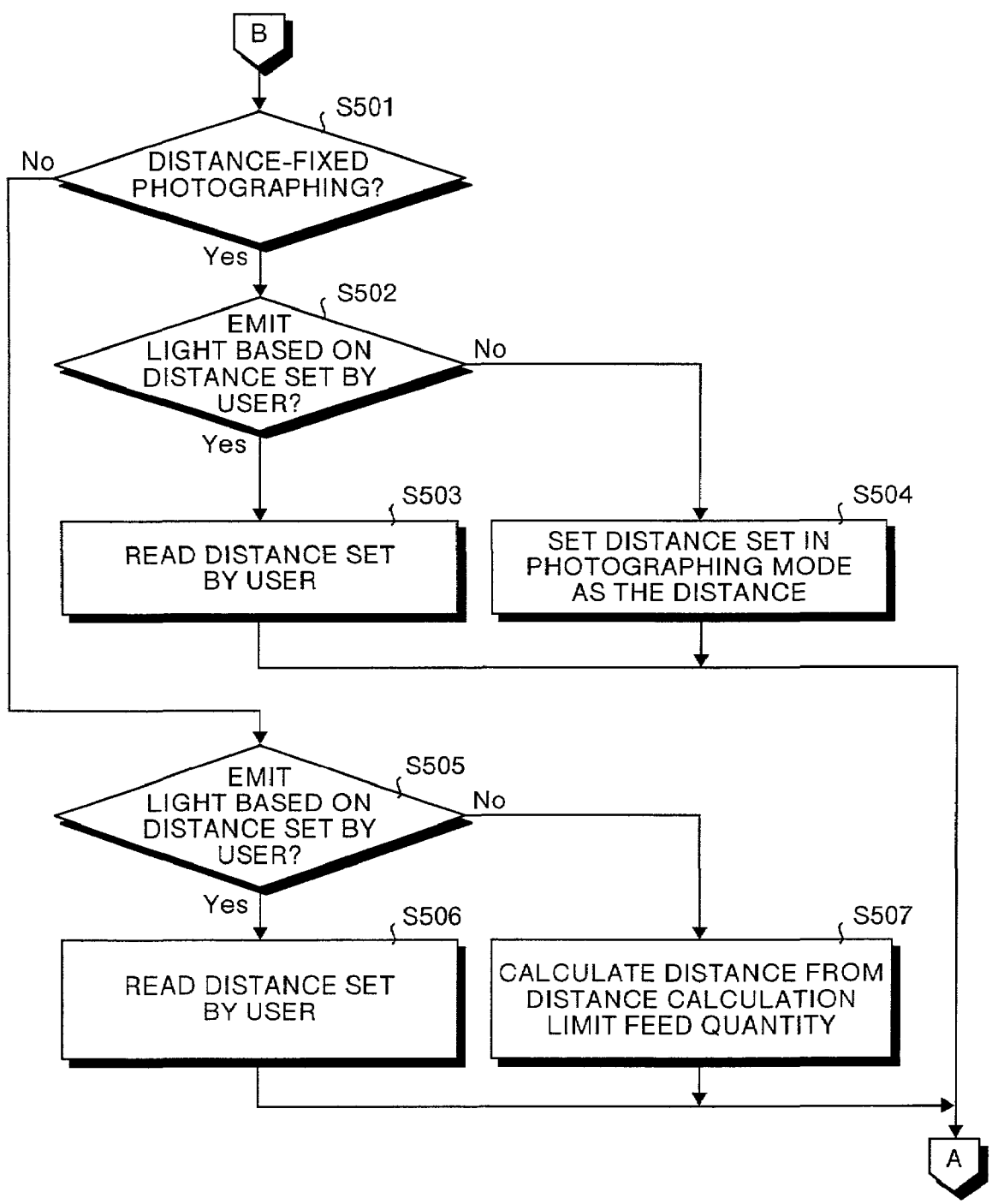
FIG. 5 is a flowchart which shows another operation of the image pick-up apparatus according to the embodiment of the present invention.

Next, in FIG. 5, when it is decided at step S407 shown in FIG. 4 that it is not possible to calculate the distance to which the light is emitted (No at step S407), it is decided whether a photographing mode is the distance-fixed photographing mode or not (step S501). When it is decided that the photographing mode is the distance-fixed photographing mode (Yes at step S501), it is decided whether light is to be emitted based on a distance set by the user or not (step S502).

When it is decided at step S502 that light is to be emitted based on a distance set by the user (Yes at step S502), the distance set by the user is read (step S503). Then, the process proceeds to the distance correction processing (see FIG. 6).

On the other hand, when it is decided at step S502 that light is not to be emitted based on a distance set by the user (No at step S502), a distance set in the photographing mode is set to the strobe distance (step S504). Then, the process proceeds to the distance correction processing (see FIG. 6).

When it is decided at step S501 that the photographing mode is not the distance-fixed photographing mode (No at step S501), it is decided whether light is to be emitted baled on a distance set by the user or not (step S505). When it is decided that light is to be emitted based on a distance set by the user (Yes at step S505), the distance set by the user is read (step S506). Then, the process proceeds to the distance correction processing (see FIG. 6).

On the other hand, when it is decided at step S505 that light is not to be emitted based on a distance set by the user (No at step S505), the distance is calculated from a distance calculation limit feed quantity (step S507). Then, the process proceeds to the distance correction processing (see FIG. 6).

FIG. 6 shows a flowchart of the distance correction processing. In FIG. 6, it is decided whether the distance set by the user ("user distance") is to be corrected or not (step S601). When it is decided that the user distance is not to be corrected (No at step S601) the process proceeds to the distance display processing (step S701 and after) shown in FIG. 7 to be described later. On the other hand, when it is decided at step S601 that the user distance is to be corrected (Yes at step S601), it is decided whether the correction is to be carried out based on the EV value (step S602).

When it is decided at step S602 that the correction is to be carried out based on EV value (Yes at step S602) the user distance is corrected based on set EV value for correction (step S603). After the correction, the process proceeds to the strobe distance display processing (see FIG. 7). On the other hand, when it is decided that the correction is not to be carried out based on the EV value (No at step S602), the user distance is corrected based on set distance for correction (step S604). After the correction, the process proceeds to the distance display processing (see FIG. 7).

FIG. 7 shows a flowchart of the distance display processing. In FIG. 7, all strobe distance measured results are erased (step S701). In other words, all the information regarding distance (i.e the display by the monitor display section 109, the LCD display section 122, and the distance measurement result display LED 123) erased.

Next, it is decided whether distance is to be displayed or not (step S702). When it is decided that the distance is not to be displayed (No step S702), the processing finishes. On the other hand, when it is decided that the distance is to be displayed (Yes step S702), it is decided whether the display is to be made on the monitor display section 109 (step S703).

When it is decided at step S703 that the display is to be made on the monitor display section 109 (Yes at step S703), the calculated strobe distance is displayed on the monitor display section 109 (step S704), and the processing finishes.

At step S704, the distance is displayed on the monitor display section 109, when a distance has been measured successfully at step S402 (Yes at step S402) in FIG. 4. On the other hand, when a distance has not been measured successfully at step S402 (No at step S402) in FIG. 4, the distance is displayed on the monitor display section 109 in the color determined for each distance calculation method, or the distance is displayed in flicker on the monitor display section 109 in the period determined for each strobe distance calculation method.

When it is decided at step S703 that the display is not to be made on the monitor display section 109 (No at step S703), it is decided whether the display is to be made on the LCD display section 122 or not (step S705). When it is decided at step S705 that the display is to be made on the LCD display section 122 (Yes at step S705), the distance is displayed on the LCD display section 122 (step S706), and the processing finishes.

At step S706, the distance is displayed on the LCD display section 122, and the processing finishes, when a distance has been measured successfully at step S402 (Yes at step S402) in FIG. 4. On the other hand, when a distance has not been measured successfully at step S402 (No at step S402) in FIG. 4, the calculated strobe distance is displayed in flicker on the LCD display section 122 in the period determined for each strobe distance calculation method, and the processing finishes.

When it is decided at step S705 that the display is not to be made on the LCD display section 122 (No at step S705), it is decided that whether a distance has been measured successfully or not, by assuming that the distance is displayed on the distance measurement result display LED 123 (step S707). When a distance has been measured successfully (Yes at step S707), the distance measurement result display LED 123 makes a display (step S708), and the processing finishes. On the other hand, when a distance has not been measured successfully (No at step S707), the distance measurement result display LED 123 makes a display in flicker in the period determined for each strobe distance calculation method (step S709), and the processing finishes.

As explained above, according to the present embodiment, even when the distance measuring device 126 has failed to measure a distance to the subject, it is possible to obtain proper strobe light intensity.

As explained above, according to the present invention, there is an effect that it is possible to provide an image pick-up apparatus that can obtain proper strobe light intensity, even if the distance measuring device has failed to measure a distance to the subject.

Moreover, in the image pick-up apparatus, a user can adjust light emission level of the light intensity so that more proper strobe light intensity can be obtained.

Furthermore, in the image pick-up apparatus, since a liquid-crystal display is provided, the image pick-up apparatus need not be provided with the monitor display so that electric consumption can be reduced.

The present document incorporates by reference the entire contents of Japanese priority document, 2001-121538 filed in Japan on Apr. 19, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image pick-up apparatus comprising:
   a distance measuring unit that measures a distance to a subject and outputs distance measurement information when measurement of the distance is successful;
   at least one distance deciding unit that decides the distance to the subject based on a specific method when the distance measuring unit has failed to measure the distance to the object;
   a light intensity determining unit that determines an intensity of light corresponding to the distance to the subject; and
   a stroboscope that emits a light of the intensity determined by the light intensity determining unit,
   wherein the distance deciding unit decides the distance to the object based on the present feed quantity of a focus lens.

2. The image pick-up apparatus according to claim 1, further comprising a storage unit which stores a distance for each photographing mode in advance,
   wherein the distance deciding unit decides the distance stored in the storage unit as the distance to the subject.

3. The image pick-up apparatus according to claim 1, further comprising a setting unit which sets a value,
   wherein the distance deciding unit decides the value set by the setting unit as the distance to the subject.

4. The image pick-up apparatus according to claim 1, wherein the distance deciding unit decides the distance to the subject based on a limit feed quantity.

5. The image pick-up apparatus according to claim 1, further comprising an operating unit with which a user sets a value,
   wherein the distance deciding unit decides the value set by the user as the distance to the subject.

6. The image pick-up apparatus according to claim 1, further comprising a selecting unit and a plurality the distance deciding units,
   wherein the selecting unit selects one of the distance deciding units and makes the selected distance deciding unit decide the distance to the subject.

7. The image pick-up apparatus according to claim 6, wherein the selecting unit makes selection of the distance deciding unit based on a degree of preference provided to each of the distance deciding units.

8. The image pick-up apparatus according to claim 1, further comprising an operating unit with which a user changes the light intensity determined by the light intensity determining unit.

9. The image pick-up apparatus according to claim 8, the operating unit is means for changing an exposure value.

10. The image pick-up apparatus according to claim 1, further comprising an operating unit with which a user changes the distance to the subject decided by the distance deciding unit.

11. The image pick-up apparatus according to claim 1, further comprising a display unit which displays the distance to the subject.

12. The image pick-up apparatus according to claim 11, wherein the display unit is a monitor.

13. The image pick-up apparatus according to claim 11, wherein the display unit is a liquid crystal display.

14. The image pick-up apparatus according to claim 11, wherein the display unit is at least one light emitting diode.

15. The image pick-up apparatus according to claim 1, further comprising a display unit which displays the method based on which the distance deciding unit decides the distance to the subject.

16. The image pick-up apparatus according to claim 15, wherein the display unit displays the method in flicker and changes the period of the flicker based on the method.

17. The image pick-up apparatus according to claim 16, wherein the display unit is a monitor.

18. The image pick-up apparatus according to claim 16, wherein the display unit is a liquid crystal display.

19. The image pick-up apparatus according to claim 16, wherein the display unit is at least one light emitting diode.

20. The image pick-up apparatus according to claim 1, further comprising a display unit which displays a message indicating that measurement of the distance to the subject has failed when the distance measurement information is not output by the distance measuring unit.

21. The image pick-up apparatus according to claim 20, wherein the display unit displays the distance to the subject decided by the distance deciding unit in color.

22. The image pick-up apparatus according to claim 20, wherein the display unit is a monitor.

23. The image pick-up apparatus according to claim 20, wherein the display unit is a liquid crystal display.

24. The image pick-up apparatus according to claim 20, wherein the display unit is at least one light emitting diode.

25. The image pick-up apparatus according to claim 1, wherein the distance deciding unit decides the distance to the subject based on one or more selected from a group consisting of a position or state of the image pick-up apparatus and a photographing mode set in the image pick-up apparatus.

26. An image pick-up apparatus comprising:

a distance measuring unit that measures a distance to a subject and outputs distance measurement information when measurement of the distance is successful;

a distance deciding unit that decides the distance to the subject based on a specific method when the distance measuring unit has failed to measure the distance to the subject;

a light intensity determining unit that determines an intensity of light corresponding to the distance to the subject; and a stroboscope that emits a light of the intensity determined by the light intensity determining unit, the distance deciding unit having one or more selected from a group comprising from a first to forth distance deciding units, wherein the first distance deciding unit determines the distance to the subject based on the present feed quantity of a focus lens;

the second distance deciding unit having a setting unit which sets a value, wherein the second distance deciding unit decides the value set by the setting unit as the distance to the subject;

the third distance deciding unit determines the distance to the subject based on a limit feed quantity; and the fourth distance deciding unit having an operating unit with which a user sets a value, wherein the fourth distance deciding unit decides the value set by the user as the distance to the subject, further comprising a selecting unit which selects one of the first to fourth distance deciding units and makes the selected distance deciding unit decide the distance to the subject, wherein the selecting unit selects the first distance deciding unit, the second distance deciding unit when the first distance deciding unit is unable to decide the distance to the subject, the third distance deciding unit when the second distance deciding unit is unable to decide the distance to the subject, and the fourth distance deciding unit when the third distance deciding unit is unable to decide the distance to the subject.

* * * * *